US006246969B1

United States Patent
Sinclair et al.

(10) Patent No.: US 6,246,969 B1
(45) Date of Patent: Jun. 12, 2001

(54) METHOD AND APPARATUS FOR TESTING COMPUTER COOLING SYSTEMS

(75) Inventors: Mark T. Sinclair, Lagrangeville; Francis G. Cascio, Highland; Marc H. Coq, Hyde Park; Ronald D. Critelli, Fishkill; Frank M. Desiano; Terrence A. Quinn, both of Poughkeepsie; Daren Simmons, Beacon, all of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/149,599

(22) Filed: Sep. 8, 1998

(51) Int. Cl.[7] .......................... G01L 25/00; G01M 10/00; G01M 15/00

(52) U.S. Cl. .......................... 702/113; 702/130; 700/299; 700/300

(58) Field of Search .................................... 702/132, 123, 702/130, 133–136, 113; 700/299, 300; 374/145

(56) References Cited

U.S. PATENT DOCUMENTS

| | | | | |
|---|---|---|---|---|
| 3,757,530 | * | 9/1973 | Doyle et al. | 62/117 |
| 3,942,912 | * | 3/1976 | Cawley | 417/53 |
| 4,351,271 | * | 9/1982 | Mueller et al. | 119/14.09 |
| 4,438,295 | * | 3/1984 | Hales | 179/2 A |
| 5,083,438 | * | 1/1992 | McMullin | 62/192 |
| 5,148,863 | * | 9/1992 | Fouts et al. | 165/149 |
| 5,590,061 | * | 12/1996 | Hollowell et al. | 364/571.03 |
| 5,603,570 | * | 2/1997 | Shimizu | 374/100 |
| 5,623,594 | * | 4/1997 | Swamy | 395/180 |
| 5,793,608 | * | 8/1998 | Winick et al. | 361/695 |

* cited by examiner

Primary Examiner—Kamini Shah
Assistant Examiner—Demetrius Pretlow
(74) Attorney, Agent, or Firm—Floyd Gonzales; Cantor Colburn LLP

(57) ABSTRACT

A method and apparatus for testing cooling units used in computers is presented. Testing of such cooling systems increases the reliability thereof, which in turn increases the reliability of the computers utilizing these cooling systems. The cooling system tester comprises a test frame which supports a plurality of evaporators, associated modular cooling units (units under test) and associated fan or blower assemblies. A heating element is attached to each of these evaporators to act as a heat load for the corresponding modular cooling unit, i.e., to simulate the heat load of an actual computer. The heat output of the heating elements are controlled by a computer. The power supplied to the modular cooling units is also regulated (controlled) by the computer. A program in the computer runs a test on each of the modular cooling units. The program checks for user input and the installation of a modular cooling unit. For each modular cooling unit installed for testing a modular cooling unit control subroutine is executed. The modular cooling unit control subroutine runs at series of test procedures a various speed, power, and timing settings.

29 Claims, 6 Drawing Sheets

METHOD AND APPARATUS FOR TESTING COMPUTER COOLING SYSTEMS

BACKGROUND OF THE INVENTION

The present invention relates to cooling systems for computers. More specifically, the present invention relates to a method and apparatus for testing cooling systems utilized in computers.

Computer technology has been increasing in complexity, density, speed and processing power for many years. Presently, the power of computers is essentially doubling every eighteen months. A consequence of this trend is that the dissipation of the heat generated by these computers has increasingly become a problem. It is recognized that as the computers' heat load and heat density increases, the cooling becomes increasingly critical to the proper operation of the computers. With the increasing need to cool the computers (to dissipate this heat) various cooling schemes such as passive convection, chilled cooling water and refrigeration have been developed for computers. Moreover, cooling is not just a way of extending the lifetime and reliability of the components of the computer, but is a requirement of proper operation in certain large computer systems, as without proper cooling certain logic operations in these large computer systems will immediately cease to function. Thus, the need for higher capacity and higher reliability cooling systems for computers.

SUMMARY OF THE INVENTION

It is an object of the present invention to increase the reliability of cooling systems for computers. It is a further object of the present invention to accurately and efficiently test cooling systems for computers. Testing of such cooling systems increases the reliability thereof, which in turn increases the reliability of the computers utilizing these cooling systems.

These and other objects of the invention are achieved by the method and apparatus for testing cooling systems for computers of the present invention. In accordance with the present invention a cooling system tester comprises a test frame which supports a plurality of evaporators, associated modular cooling units (units under test) and associated fan or blower assemblies. These modular cooling units may comprise a refrigeration or cooling unit which may also have associated with it a motor drive assembly card which is utilized to control the associated blower assembly and/or a motor drive assembly high output card utilized to control the associated modular cooling unit. In accordance with a preferred embodiment of the present invention, each modular cooling unit is independent in terms of testing, installation and removal of each other modular cooling unit.

The evaporators each comprise evaporative cooling plates which are basically the same as the cooling plates found in the computer system in which the modular cooling units are to be installed. A plurality of heating elements are attached to each of these evaporators to act as a heat load for the corresponding modular cooling unit, i.e., to simulate the heat load of an actual computer. It is desirable that the cooling plates and the heating elements closely emulate the operation of an actual computer system. The heat output of the heating elements are controlled by a computer. The power supplied to the modular cooling units is also regulated (controlled) by the computer.

For each modular cooling unit, a refrigerant line is provided from the outlet of the modular cooling unit to the inlet of the evaporator, with a pressure sensor sensing the pressure of the refrigerant in this line and a solenoid regulating the flow of refrigerant in this line. A refrigerant line is provided from the inlet of the modular cooling unit to the outlet of the evaporator, with a pressure gage unit measuring the pressure of the refrigerant in this line and a solenoid regulating the flow of refrigerant in this line. The solenoids receive command signals from the computer and the pressure sensor provides a sensed signal to the computer.

A program in the computer runs a test on each of the modular cooling units. The program checks for user input and the installation of a modular cooling unit. For each modular cooling unit installed for testing a modular cooling unit control subroutine is executed. The modular cooling unit control subroutine runs a series of test procedures at various speed, power, and timing settings. The duration of the test is selected and/or adjusted to detect defects introduced in the build process of modular cooling units.

The above-discussed and other features and advantages of the present invention will be appreciated and understood by those skilled in the art from the following detailed description and drawings.

BRIEF DESCRIPTION OF THE DRAWINGS

Referring now to the drawings wherein like elements are numbered alike in the several FIGURES.

DESCRIPTION OF THE PREFERRED EMBODIMENT

Figure 1:
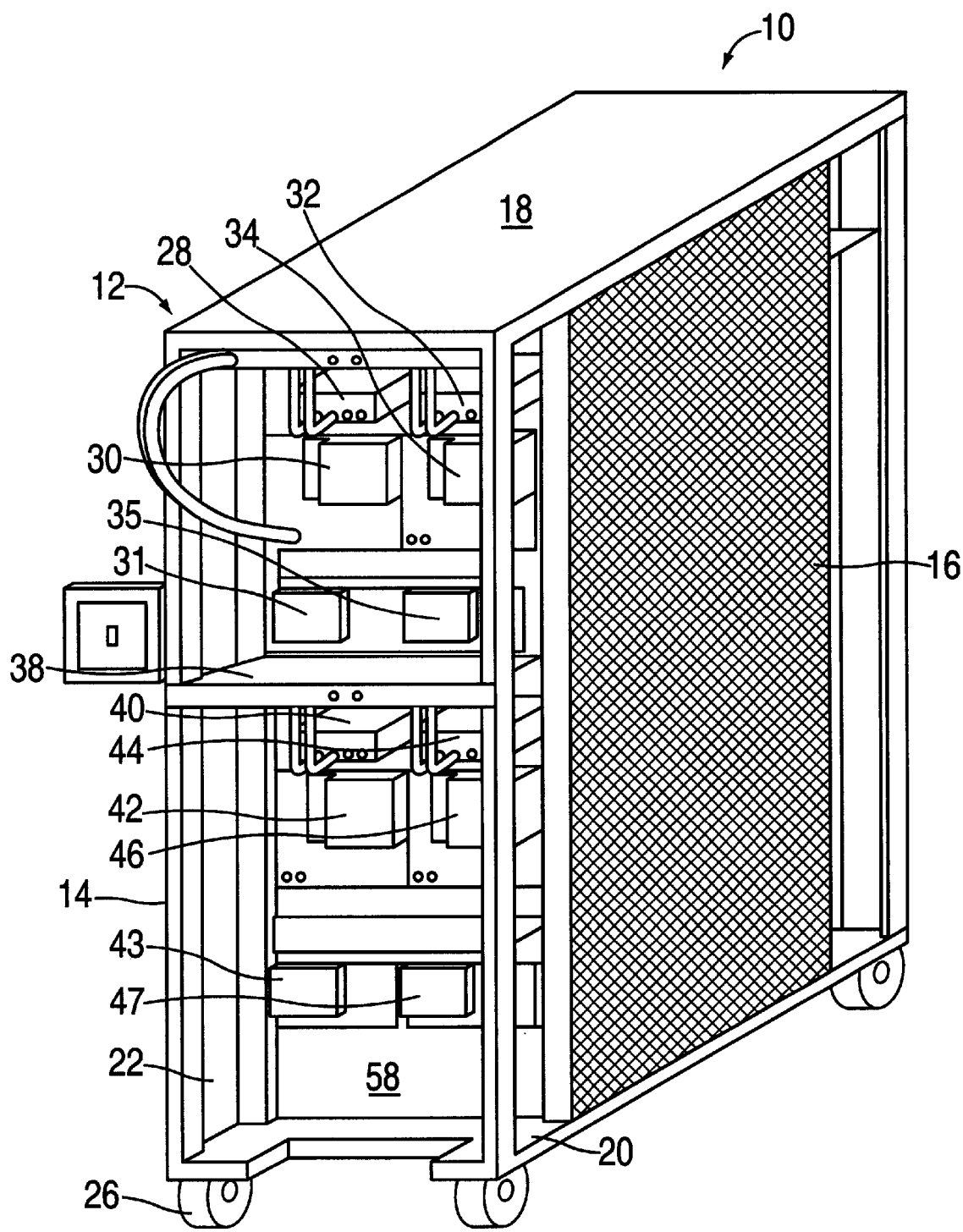
FIG. 1 is a front perspective view of a cooling system tester in accordance with the present invention.
Figure 2:
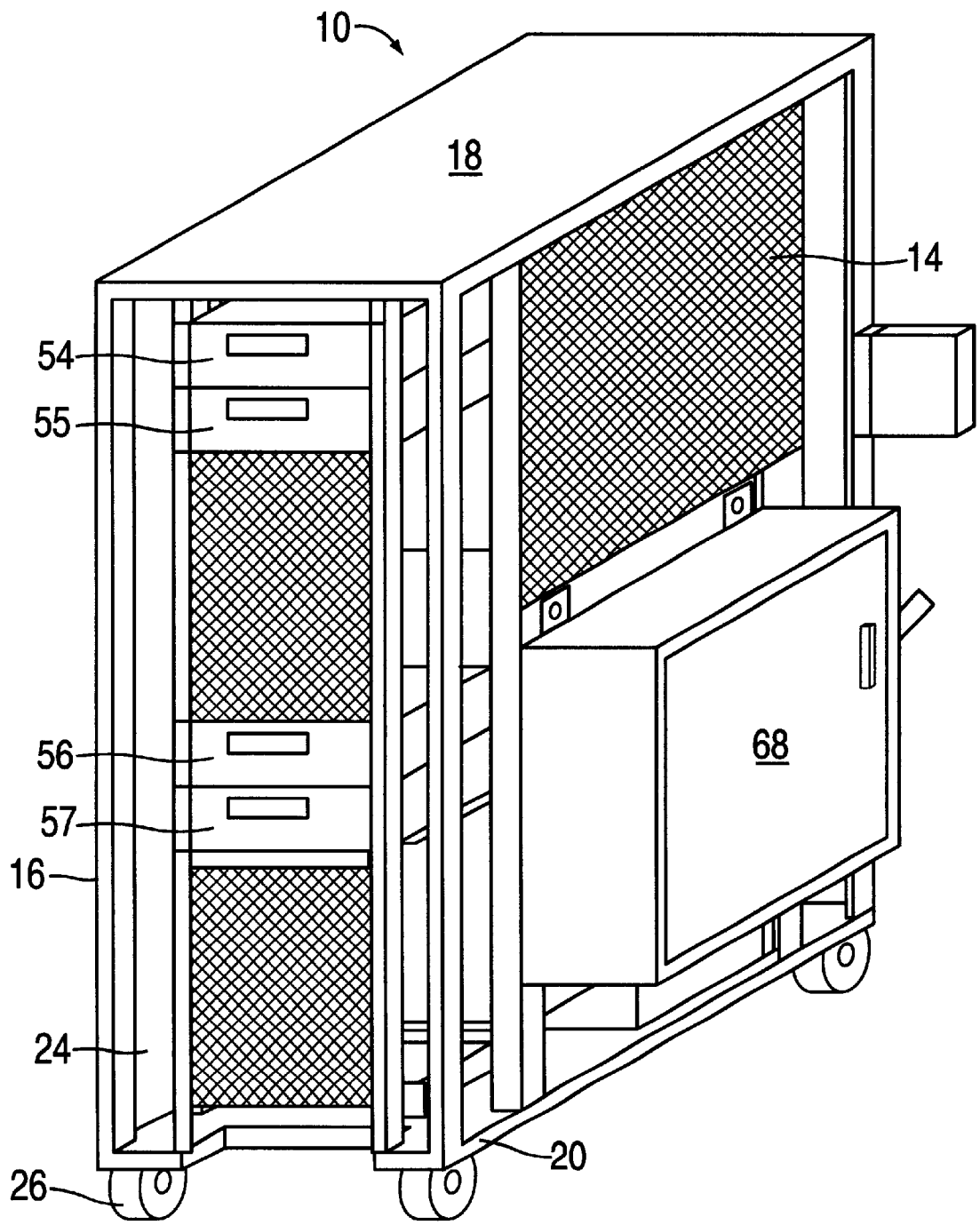
FIG. 2 is a rear perspective view of the cooling system tester of FIG. 1.

Referring to FIGS. 1 and 2, a cooling system tester in accordance with the present invention is shown generally at 10. The tester 10 comprises a test frame 12 having opposing side panels 14, 16, a top panel 18, and a base or bottom panel 20, defining a front opening 22 and a rear opening 24. The side panels 14 and 16 are preferably vented to allow air flow through the tester 10. Wheels 26 are provided at the base 20 of the test frame 12 for moving the tester 10 as desired. The test frame 12 supports a first evaporator 28, an associated first modular cooling unit 30 and an associated first fan or blower assembly 31, and a second evaporator 32, an associated second modular cooling unit 34 and an associated second fan or blower assembly 35, at the upper portion thereof. A shelf 38 is provided in the frame 12 at this level. The test frame 12 further supports a third evaporator 40, an associated third modular cooling unit 42 and an associated third fan or blower assembly 43, and a fourth evaporator 44, an associated fourth modular cooling unit 46 and an associated fourth fan or blower assembly 47, at the lower portion thereof. The modular cooling units are the units to be tested by the tester 10 in accordance with the present invention. Moreover, these modular cooling units may comprise a refrigeration or cooling unit which may also have associated with it a motor drive assembly card (not shown) which is utilized to control the associated blower assembly and/or a motor drive assembly high output card (not shown) utilized to control the associated modular cooling unit. In accordance with a preferred embodiment of the present invention, each modular cooling unit is independent in terms of testing, installation and removal of each other modular cooling unit.

The evaporators 28, 32, 40, 44 each comprise evaporative cooling plates which are basically the same as the cooling plates found in the computer system in which the modular cooling units are to be installed. A plurality of heating elements 49–52 (FIG. 3) are attached to each of these evaporators to act as a heat load for the corresponding modular cooling unit, i.e., to simulate the heat load of an actual computer. It is desirable that the cooling plates and the heating elements closely emulate the operation of an actual computer system. Power supplies 54–57 are supported at the rear of the frame 12 to provide power to each of the heating element 49–52, respectively. Each of the power supplies 54–57 comprises a 1000 Watt power supply having a interface for communicating over a standard communication protocol, such as the General Purpose Interface Bus (GIB) protocol.

A bulk power assembly 58 for proving power to each of the modular cooling units 30, 34, 42, 46 and the blower assemblies 31, 35, 43, 47 is supported at the bottom of the test frame 12. The bulk power assembly 58 (FIG. 3) comprises an a.c. input 60, a bulk power regulator 62 (for transforming a 120 volts a.c. signal from input 60 to a 350 volts d.c. signal), a bulk power controller 64 and an associated bulk power distributor 66, all of which are interconnected by a gate/backplane or other appropriate wiring (not shown). The bulk power assembly 58 (FIG. 3) may further include a cooling fan 67, as is well known with power supply systems. A power distribution box 68 is mounted at the side 14 of the frame 12 and comprise, e.g., a NEMA rated distribution box which is supplied with 60 amp, 208 volt, 3 phase.

Figure 3:
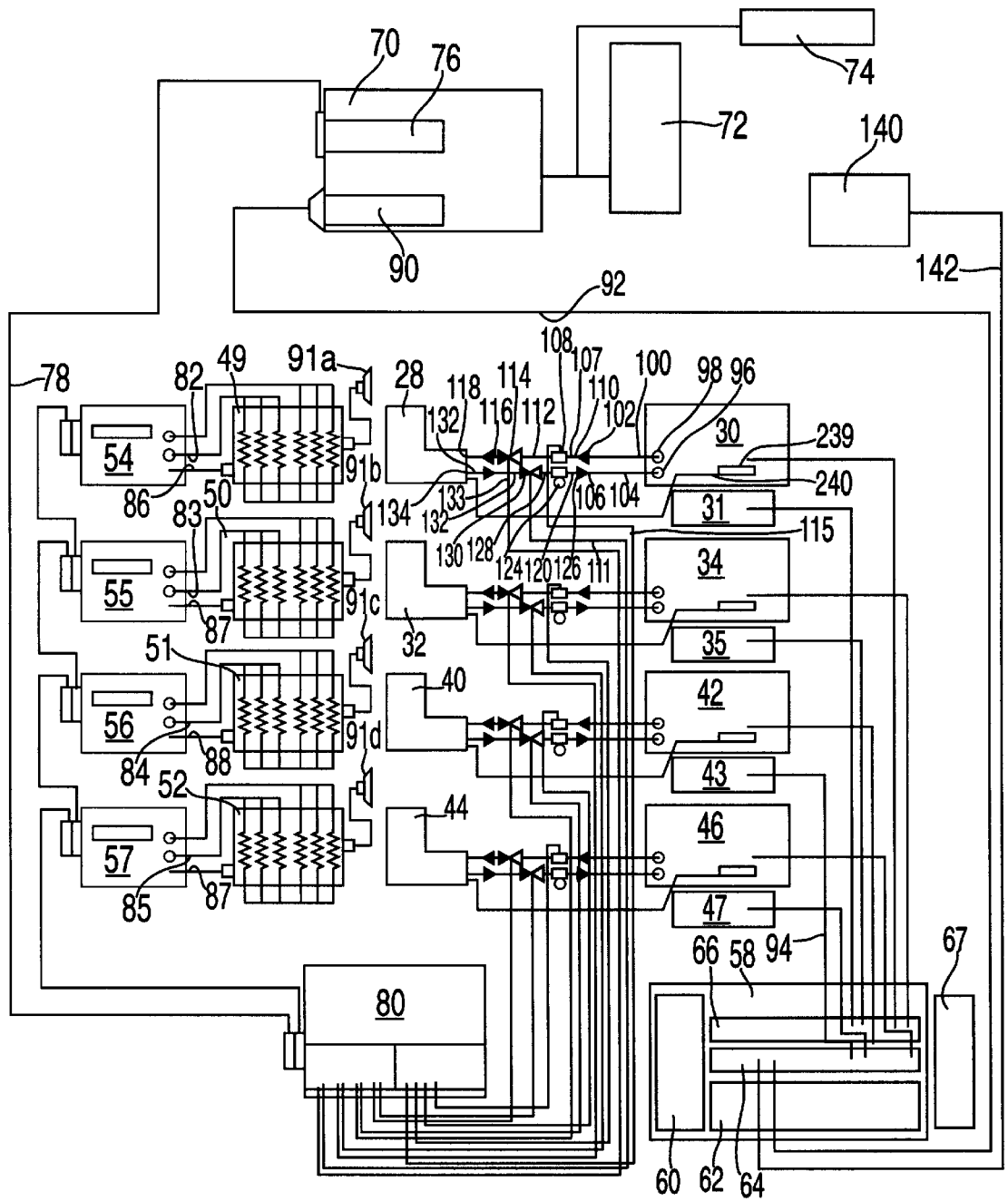
FIG. 3 is a schematic block diagram of the cooling system tester of FIG. 1.

Referring now to FIG. 3, a computer 70 having a keyboard 72 interfacing with the computer 70 is provided for running a test and recording test results in accordance with the present invention. A bar code scanner 74 may also be connected to the computer 70 and used to identify a modular cooling unit under test, which is itself coded with a bar code. The computer 70 has a first interface 76 having the standard communication protocol (GPIB) utilized by the power supplies 54–57. The interface 76 is connected by a line 78 in a daisy chain fashion to a switch and relay control logic 80 located within the frame 12 and to each of the power supplies 54–57 at there interfaces. The switch and relay control logic 80 communicates with and is controlled by the computer 70 over the line 78. As mentioned above, the power supplies 54–57 provide power to respective heating elements (heater blocks) 49–52 over corresponding lines 82–85. The power supplies 54–57 are controlled by the computer 70 to provided power signals to the heating elements 49–52 for generating a desired amount of heat, as dictated by the testing process. The heating elements 49–52 each include an over temperature sensor which generates an over temperature signal when an over temperature condition is detected. The over temperature signals are presented to the corresponding power supply 54–57 by lines 86–89, respectively, to shutoff the power supplied to the corresponding heating element 49–52. The over temperature signals may also be provided to the computer 70 over the line 78 for data synthesis and/or operator display. An over temperature condition may result, for example, when a modular cooling unit is not able to remove the heat, as required, causing the heat to buildup in the corresponding heating element above an over temperature threshold, e.g., 120° F. Further, each heating element 49–52 has an alarm 91*a–d* (e.g., audible or visual) that is triggered when an over temperature condition is detected, to alert an operator to this condition. The heating elements 49–52 each further include a low temperature reset for allowing power to be reapplied after the occurrence of an over temperature condition, such as when the corresponding temperature sensor detects a temperature below a reset threshold, e.g., 95° F.

The computer 70 has a second interface 90 having a standard communication protocol (e.g., a RS455 interface protocol) which is utilized by the bulk power controller 64. The interface 90 is connected by a line 92 to an interface of the bulk power controller 64 of the bulk power assembly 58. The bulk power controller 64 is controlled by the computer 70 to instruct the bulk power distributor 66 in providing power signals over lines 94 to the modular cooling units 30, 34, 42, 46 and the blower assemblies 31, 35, 43, 47, as dictated by the testing process.

The interconnection and control of the modular cooling unit 30, the evaporator 28 and the blower assembly 31 are described below, with the interconnection of the modular cooling units 34, 42, 46, the evaporators 32, 40, 44 and the blower assemblies 35, 43, 47, all respectively, being the same, whereby no further description thereof is required. The modular cooling unit 30 has a refrigerant inlet 96 and a refrigeration outlet 98. An insulated hose 100 is connected at one end thereof to the outlet 98 with the other end of the hose 100 having a quick connect/disconnect connector 102 thereat. An insulated hose 104 is connected at one end thereof to the inlet 96 with the other end of the hose 104 having a quick connect/disconnect connector 106 thereat. An insulated hose 107 is connected at one end thereof to one end of a pressure sensor 108 with the other end of the hose 107 having a quick connect/disconnect connector 110 thereat. The connector 110 is connected to the connector 102. An insulated hose 112 is connected at one end thereof to the other end of the pressure sensor 108 and the other end of the hose 112 is connected to one end of a solenoid 114. An insulated hose 116 is connected at one end thereof to the other end of the solenoid 114 and the other end of the hose 116 is connected to an inlet 118 of the evaporator 28. The hose 116 may comprise two hoses connected by quick connect/disconnect connectors to provide for ease of servicing components of the tester. The hoses 100, 107, 112 and 116 define a refrigerant line from the outlet 98 of the modular cooling unit 30 to the inlet 118 of the evaporator 28, with the pressure sensor 108 sensing the pressure of the refrigerant in this line and the solenoid 114 regulating the flow of refrigerant in this line. The pressure sensor 108 communicates a sensed pressure signal to the switch and relay control logic 80 over a line 115 and the solenoid 114 receives a command signal from the switch and relay control logic 80 over a line 117. These signal are processed and generated in accordance with the testing process of the present invention as controlled by the computer 70 and its interfacing with the switch and relay control logic 80 over the bus (line) 78. An insulated hose 120 is connected at one end thereof to one end of a pressure gage unit 124 with the other end of the hose 120 having a quick connect/disconnect connector 126 thereat. The connector 126 is connected to the connector 106. An insulated hose 128 is connected at one end thereof to the other end of the pressure gage, unit 124 and the other end of the hose 128 is connected to one end of a solenoid 130. An insulated hose 132 is connected at one end thereof to the other end of the solenoid 130 and the other end of the hose 132 is connected to an outlet 134 of the evaporator 28. The hose 132 may comprise two hoses connected by quick connect/disconnect connectors to provide for ease of servicing components of the tester. The hoses 104, 120, 128 and 132 define a refrigerant line from the inlet 96 of the modular cooling unit 30 to the outlet 134 of the evaporator 28, with the pressure gage unit 124 measuring the pressure of the refrigerant in this line and the solenoid 130 regulating the flow of refrigerant in this line. The solenoid 130 receives a command signal from the switch and relay control logic 80 over a line 133. This signal is generated in accordance with the testing process of the present invention as controlled by the computer 70 and its interfacing with the switch and relay control logic 80 over the bus (line) 78. The refrigerant cycle comprises: liquid phase refrigerant entering the inlet 118 of the evaporator 28 from the refrigerant line defined by the hoses 100, 107, 112 and 116, then evaporated refrigerant is delivered from the outlet 134 of the evaporator 28 by the refrigerant line defined by the hoses 104, 120, 128 and 132 to the inlet 96 of the modular cooling unit 30, where it is compressed to a vapor phase refrigerant and then condensed to a liquid phase refrigerant, then the liquid phase refrigerant is delivered from the outlet 98 of the modular cooling unit 30 to the inlet 118 of the evaporator 28 by the refrigerant line defined by the hoses 100, 107, 112 and 116, thereby completing the cycle.

Also, a minimum temperature difference must exist for the evaporators 28, 32, 40, 44 to dissipate the heat built up in the system. In accordance with the requirement, an ambient temperature sensor 140 senses the ambient temperature and provides a signal indicative thereof. This signal is presented over a line 142 to the bulk power controller 64, which interfaces with the computer 70 over the bus (line) 92. The computer will adjust the pass/fail temperature limits based on an algorithm or shut down the units if room ambient is too high. The test of the present invention is a 'run-in' test, whereby it is run at ambient temperature rather than an elevated temperature (such as in a 'burn-in' test).

The personal computer 70 comprises a conventional computer having a graphical interface programming software, such as LabVIEW, loaded therein for controlling the tester 10 in accordance with the present invention. The software employs a modular programming technique which allows independent control of each of the modular cooling units during testing. For example, if a particular modular cooling unit is faulty the software will direct the tester 10 to only shut down the faulty modular cooling unit without interrupting the testing of the other modular cooling units. Parameters such as cycle time, ambient temperature, blower speed, modular cooling unit internal settings, coolant pressure and temperature, heater temperature, and power settings may be utilized by the present invention, as described more fully below.

Figure 4:
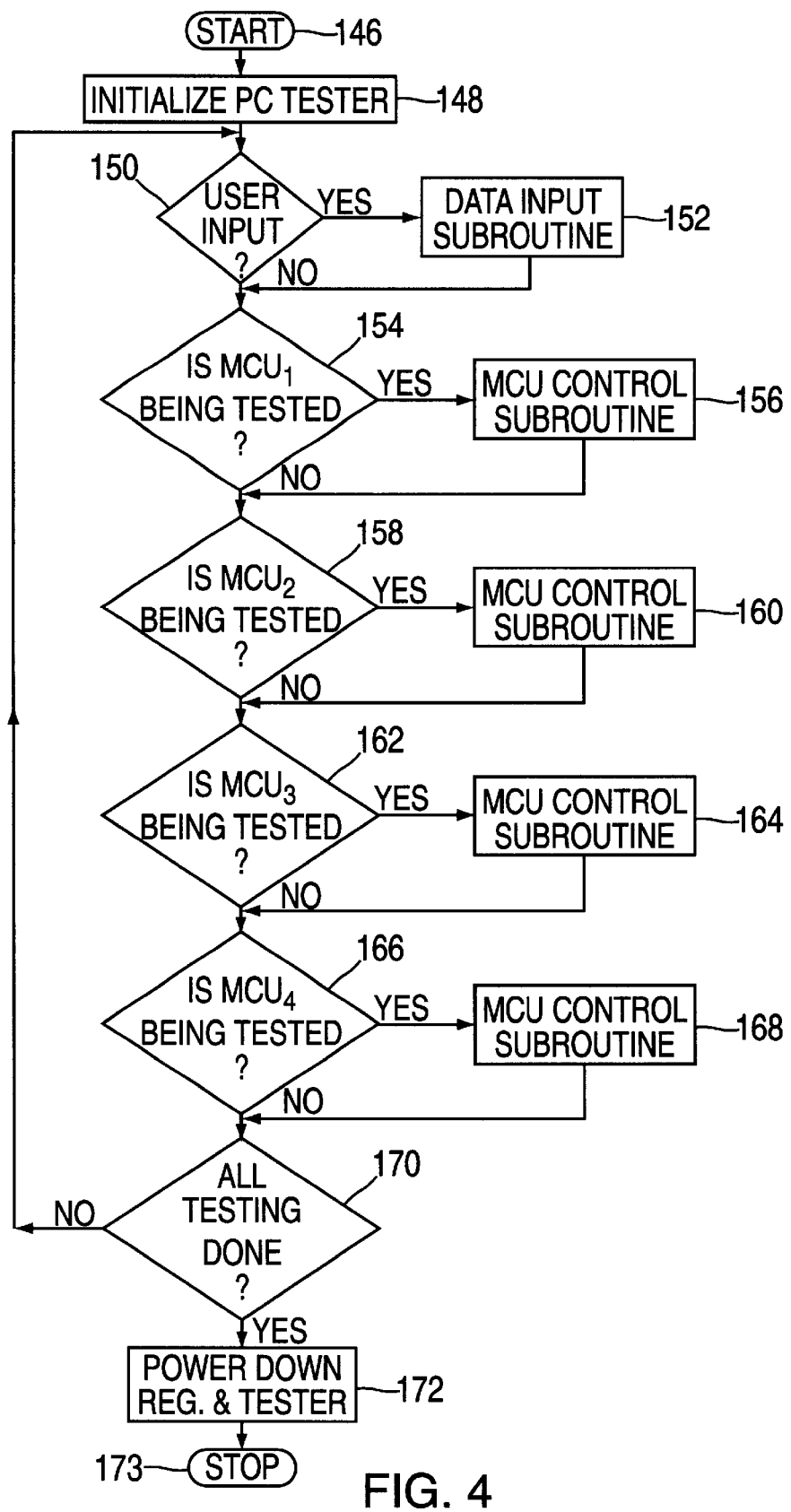
FIG. 4 is a flow diagram of a cooling unit tester control program in accordance with the present invention.

Referring to FIG. 4, a flow chart for a modular cooling unit tester control program is generally shown. The program is selected at block 146 by clicking on a BEGIN TEST button (or icon) on the computer screen. The program is initialized at block 148 then proceeds immediately to block 150. At block 1 50 the program decides whether there has been user input. If there has been input from a user then the program proceeds to block 152 wherein a data input subroutine is executed (as is known). If the program determines that there has been no user data input, or upon execution of the aforementioned data input subroutine, the program proceeds to block 154 to determine whether the modular cooling unit 30 is installed in the tester 10. If the modular cooling unit 30 is installed then the program proceeds to block 156 wherein a modular cooling unit control subroutine 157 (FIGS. 5A and B) is executed as will be more fully described herein below. If the program determines that the modular cooling unit 30 is not installed, or upon initiation of the modular cooling unit control subroutine, the program proceeds to block 158 to determine whether the modular cooling unit 34 is installed in the tester 10. If the modular cooling unit 34 is installed then the program proceeds to block 160 wherein the modular cooling unit control subroutine 157 is executed. If the program determines that the modular cooling unit 34 is not installed, or upon initiation of the modular cooling unit control subroutine 157, the program proceeds to block 162 to determine whether the modular cooling unit 42 is installed in the tester 10. If the modular refrigeration unit 42 is installed then the program proceeds to block 164 wherein the modular cooling unit control subroutine 157 is executed. If the program determines that the modular cooling unit 42 is not installed, or upon initiation of the modular cooling unit control subroutine 157, the program proceeds to block 166 to determine whether the modular cooling unit 46 is installed in the tester 10. If the modular cooling unit 46 is installed then the program proceeds to block 168 wherein the modular cooling unit control subroutine 157 is executed. If the program determines that the modular cooling unit 46 is not installed, or upon initiation of the modular cooling unit control subroutine 157, the program proceeds to block 170 to determine whether the testing is complete. The program returns to block 150 and the above process is continued until all subroutines are completed or there are no modular cooling units installed for testing and the bulk power regulator and tester are powered down in block 172 and the program is ended at block 173.

Figure 5A:
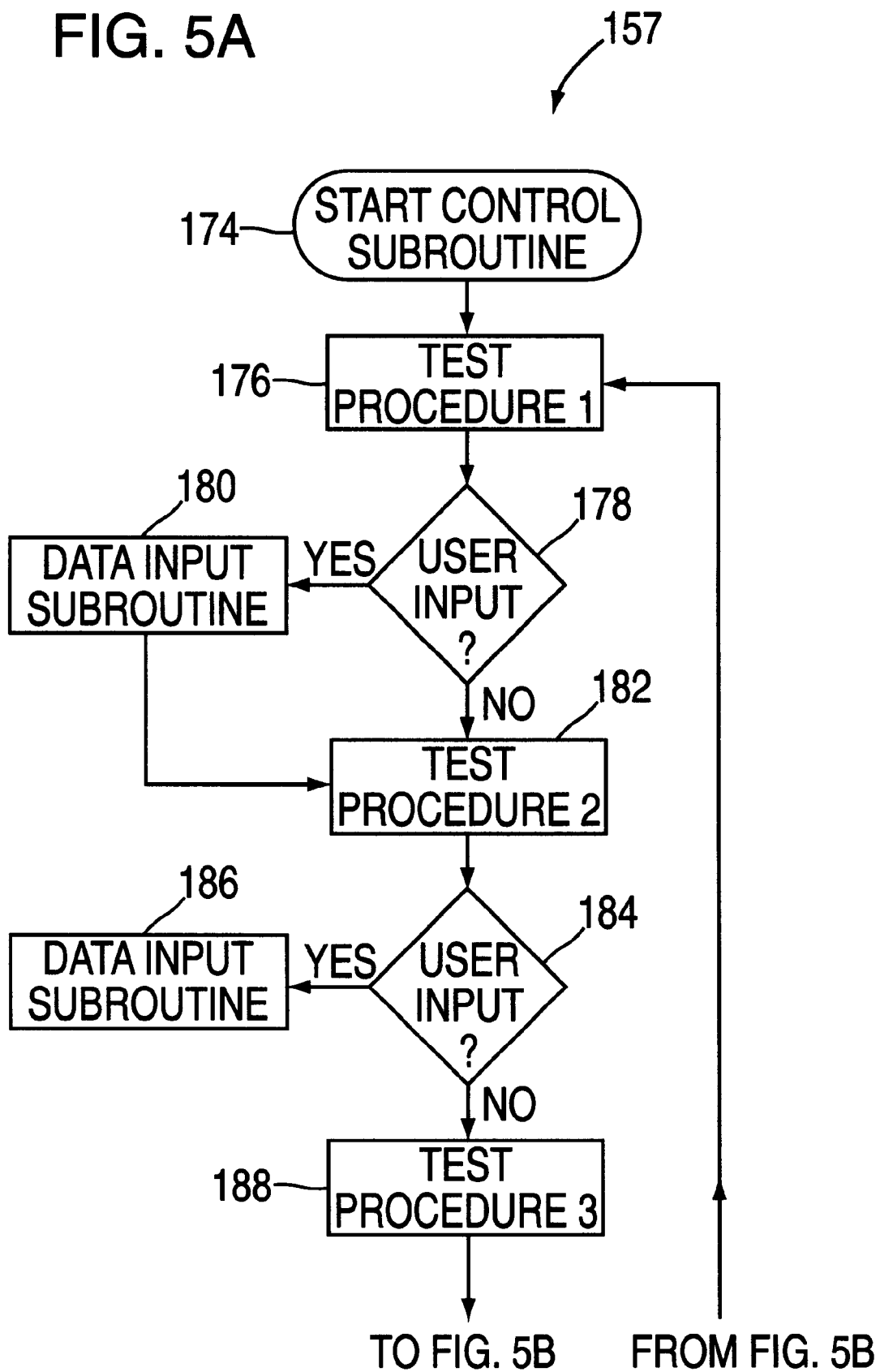
FIGS. 5A and B are a flow diagram of the cooling unit control subroutine of FIG. 4.
Figure 5B:
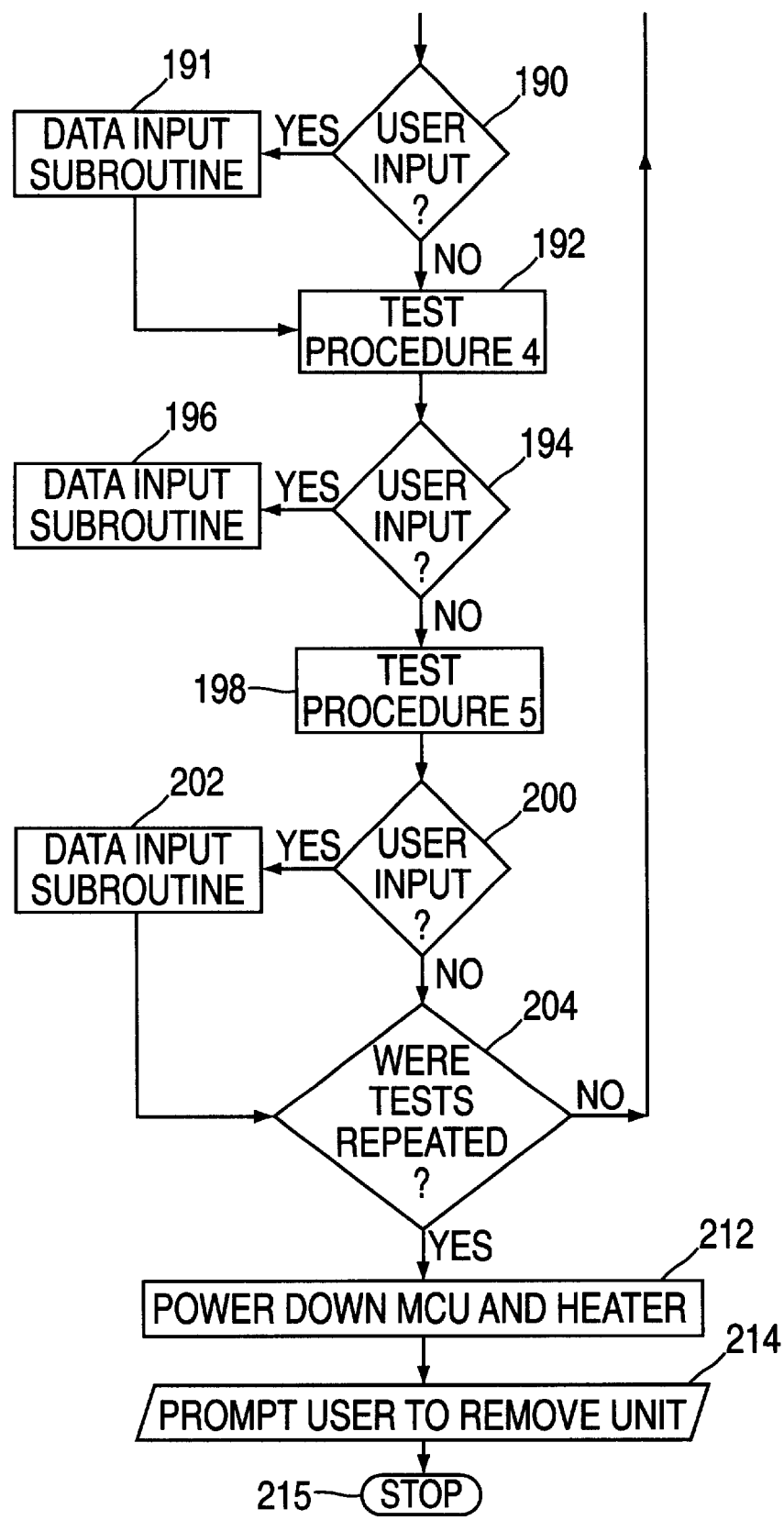

Referring to FIGS. 5A and B, a flow chart for the modular cooling unit control subroutine 157 is generally shown. The program is selected at block 174 and proceeds immediately to block 176. At block 176 a first test procedure is initiated and upon completion of the first test procedure the program proceeds to block 178 where the program decides whether there has been user input. If there has been input from a user then the program proceeds to block 180 wherein a data input subroutine is executed (as is known). If the program determines that there has been no user data input, or upon execution of the aforementioned data input subroutine, the program proceeds to block 182. At block 182 a second test procedure is initiated and upon completion of the second test procedure the program proceeds to block 184 where the program decides whether there has been a user input. If there has been input from a user then the program proceeds to block 1 86 wherein the data input subroutine is executed. If the program determines that there has been no user data input, or Upon execution of the data input subroutine, the program proceeds to block 188. At block 188 a third test procedure is initiated and upon completion of the third test procedure the program proceeds to block 190 where the program decides whether there has been a user input. If there has been input from a user then the program proceeds to block 191 wherein the data input subroutine is executed. If the program determines that there has been no user data input, or upon execution of the data input subroutine, the program proceeds to block 192. At block 192 a fourth test procedure is initiated and upon completion of the fourth test procedure the program proceeds to block 194 where the program decides whether there has been a user input. If there has been input from a user then the program proceeds to block 196 wherein the data input subroutine is executed. If the program determines that there has been no user data input, or upon execution of the data input subroutine, the program proceeds to block 198.

The first, second, third and fourth test procedures are currently the same, and comprise setting a heat load at the heating elements to 1000 Watts (e.g., maximum heat), setting the modular cooling unit's compressor speed to 2300 rpm's (low speed), setting the blower assembly speed to 1200 rpm's, and reading and recording eight thermistors (at the evaporator, the thermistors 239 communicate signals through a line 240) each minute. The readings from the thermistors are then compared to thresholds or limits to set a PASS or a FAIL status for the modular cooling unit. The pass/fail thermistor test limits are adjusted by the computer program to compensate for changes in room ambient temperature. This eliminates false failures due to room temperature changes that occur throughout the day, eliminating the need for a environmentally controlled room. These four test procedures verify normal operation of the modular cooling unit. During each of these test procedures the program polls for user input (i.e., the data input subroutine described above, to decide whether to abort or cancel the test based on user input). Each test procedure lasts for approximately 2.3 hours, and there is a two minute shutdown between each test procedure. Although, the first, second, third and fourth test procedures are identical, it is contemplated by the present invention that they have the different speed, power, and timing settings. The duration of the test is selected to exceed the time by which such units typically fail.

At block 198 a fifth test procedure is initiated and upon completion of the fifth test procedure the program proceeds to block 200 where the program decides whether there has been a user input. If there has been input from a user then the program proceeds to block 202 wherein the data input subroutine is executed. If the program determines that there has been no user data input, or upon execution of the data input subroutine, the program proceeds to block 204. The fifth test procedure comprises setting a heat load at the heating elements to 0 Watts (minimum heat), setting the modular cooling unit's compressor speed to 3900 rpm's (high speed), setting the blower assembly speed to 1200 rpm's, and running the modular cooling unit in a hot gas bypass mode, as is known, i.e., a non cooling mode. This test procedure verifies the proper operation of the hot gas bypass valve of the modular cooling unit. Again, the eight thermistors at the evaporator are read and recorded each minute and then compared to appropriate thresholds or limits. At block 204 the program determines whether each of the five test procedures has been completed twice. If the test procedures have only been conducted once then the program returns to block 176 and the above process is continued until the first, second, third, fourth and fifth test procedures are completed twice and then the program proceeds to block 212 wherein the modular cooling unit and the heater elements are powered down. The program proceeds to block 214 where a prompt is displayed for the operator to remove the modular cooling unit from the tester 10. The user is then prompted to remove the unit, and informed whether the modular cooling unit(s) has passed or failed the tests. A print out is then generated to summarize the tests and is kept with the records for the modular cooling unit(s). The program is ended at block 215.

In general, an operator identifies one or more modular cooling units to be tested by entering information for the units (e.g., serial numbers) at the keyboard 72 or with a bar code scanner 74 (providing the units are bar coded). Then the units to be tested are installed in the frame 12. The operator then attaches the appropriate quick connect/disconnect connects for each modular cooling unit to be tested. Once the modular cooling units have been installed the above described testing software is run by selecting appropriate icons. A PASS or FAIL indicator is displayed by the computer 70 for each of the modular cooling units being tested.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A tester for testing at least one cooling unit used with a computer, the cooling unit having an inlet and an outlet, comprising:
   a heating element for generating heat simulating a heat load of the computer;
   an evaporator disposed relative to said heating element for receiving heat therefrom, said evaporator having an inlet for connection to the outlet of the cooling unit under test to define a first cooling line, said evaporator having an outlet for connection to the inlet of the cooling unit under test to define a second cooling line;
   at least one temperature sensor disposed relative to said evaporator for generating at least one sensed evaporator temperature signal indicative of a temperature at said evaporator, whereby said at least one sensed evaporator temperature signal is indicative of the ability of the cooling unit under test remove the heat generated by said heating element; and
   a signal processor responsive to said at least one sensed evaporator temperature signal and having a memory for storing signals including program signals defining an executable program for conducting a test of the cooling unit.

2. The tester of claim 1 wherein said test comprises comparing said at least one sensed evaporator temperature signal to a limit signal to determine a PASS or FAIL condition for the cooling unit under test.

3. The tester of claim 1 wherein said program signals further define said executable program for configuring test parameters for the cooling unit under test.

4. The tester of claim 1 further comprising:
   a pressure sensor disposed at one of said first and second cooling lines for generating a sensed pressure signal indicative of a pressure therein, said signal processor being responsive to said sensed pressure signal.

5. The tester of claim 1 further comprising:
   a pressure gage disposed at one of said first and second cooling lines for generating a reading of a pressure therein.

6. The tester of claim 1 further comprising:
   a solenoid disposed in one of said first and second cooling lines for regulating flow therein, said solenoid being responsive to a solenoid command signal from said signal processor.

7. The tester of claim 1 wherein said heating element is responsive to a heating command signal from said signal processor to regulate the heat generated by said heating elements.

8. The tester of claim 1 wherein said heating element further includes an over temperature shutoff.

9. The tester of claim 1 further comprising:
   an air moving devices positioned relative to the cooling unit under test for providing air flow to the cooling unit under test.

10. The tester of claim 9 wherein said air moving device is responsive to an air flow command signal from said signal processor to regulate the air flow to the cooling unit under test.

11. The tester of claim 1 further comprising:

an ambient temperature sensor disposed at said tester for generating a sensed ambient temperature signal indicative of an ambient temperature at said tester, said signal processor being responsive to said sensed ambient temperature signal for prohibiting testing when the sensed ambient temperature signal exceeds a threshold.

12. The tester of claim 1 wherein said signal processor comprises a computer.

13. The tester of claim 1 wherein said evaporator comprises a plurality of evaporating plates.

14. The tester of claim 1 wherein said at least one temperature sensor comprises at least one thermistor.

15. The tester of claim 1 wherein the cooling unit comprises a modular cooling unit or a modular refrigeration unit.

16. A method of testing at least one cooling unit used with a computer, the method comprising:

connecting an outlet of a cooling unit to be tested to an inlet of an evaporator and an inlet of the cooling unit to be tested to an outlet of said evaporator;

generating heat at said evaporator to simulate a heat load of the computer;

operating the cooling unit to cool the heat at the evaporator;

sensing at least one temperature at said evaporator, said at least one sensed temperature being indicative of the ability of the cooling unit under test remove the heat generated at said evaporator; and comparing said at least one sensed temperature to a limit to determine a PASS or FAIL condition for the cooling unit under test.

17. The method of claim 16 wherein:

said operating the cooling unit comprises operating a compressor of the cooling unit at a low speed; and said generating said heat comprises generating said heat to simulate a high heat load.

18. The method of claim 16 wherein:

said operating the cooling unit comprises operating a compressor of the cooling unit at a high speed; and said generating said heat comprises generating said heat to simulate a low heat load.

19. The method of claim 18 wherein said operating the cooling unit comprises operating the cooling unit in hot gas bypass mode.

20. The method of claim 16 wherein said operating the cooling unit comprises operating the cooling unit in timed cycles.

21. The method of claim 16 further comprising:

sensing pressure in one of said first and second cooling lines and configuring the cooling unit for testing in response to said sensed pressure.

22. The method of claim 16 further comprising:

reading pressure gage in one of said first and second cooling lines and configuring the cooling unit for testing in response to said read pressure.

23. The method of claim 16 further comprising:

regulating a flow in one of said first and second cooling lines to configure the cooling unit for testing.

24. The method of claim 16 further comprising:

detecting an over temperature condition at said evaporator and ceasing said generating said in response thereto.

25. The method of claim 16 further comprising:

providing air flow to the cooling unit under test.

26. The method of claim 25 further comprises:

regulating the air flow to the cooling unit under test.

27. The method of claim 16 further comprising:

sensing an ambient temperature and prohibiting testing when the ambient temperature exceeds a threshold.

28. The method of claim 16 wherein said evaporator comprises a plurality of evaporating plates.

29. The method of claim 16 wherein the cooling unit comprises a modular cooling unit or a modular refrigeration unit.

* * * * *